United States Patent [19]

Komai et al.

[11] Patent Number: 4,858,666
[45] Date of Patent: Aug. 22, 1989

[54] RADIAL TIRE

[75] Inventors: Yukio Komai, Shiga; Keijiro Oda, Hyogo, both of Japan

[73] Assignee: Toyo Tire & Rubber Company Limited, Osaka, Japan

[21] Appl. No.: 857,637

[22] Filed: Apr. 30, 1986

[30] Foreign Application Priority Data

Apr. 30, 1985 [JP] Japan .................................. 60-94211

[51] Int. Cl.$^4$ .............................................. B60C 9/08
[52] U.S. Cl. ..................... 152/556; 152/451; 152/548
[58] Field of Search ............... 152/451, 548, 560, 556; 57/902

[56] References Cited

U.S. PATENT DOCUMENTS

Re. 26,824 3/1970 Stow et al. ........................ 57/902 X
3,432,575 3/1969 Zimmerman .................... 152/451 X

FOREIGN PATENT DOCUMENTS 58-04602 1/1983 Japan .................................. 152/556
59-82472 5/1984 Japan .
59-87140 5/1984 Japan .
59-89203 5/1984 Japan .................................. 152/556

OTHER PUBLICATIONS

Patent Abstracts of Japan, vol. 8, No. 184 (C-239) [1621], C Field, p. 42, entry 59-76914, 8-23-84.
Patent Abstracts of Japan, vol. 8, No. 199 (C-242) [1636], C Field, pp. 27-28, entries 59-88910, 59-88911, 9-12-84.

Primary Examiner—Michael W. Ball
Assistant Examiner—Ramon R. Hoch
Attorney, Agent, or Firm—Birch, Stewart, Kolasch & Birch

[57] ABSTRACT

A radial tire improved in steering stability, durability and appearance comprising a nylon cord of high modulus and excellent dimensional stability obtained by impregnating a nylon cord substantially composed of polytetramethyleneadipamide with an adhesive and heat setting the nylon cord under a stretch state.

2 Claims, 1 Drawing Sheet

RADIAL TIRE

BACKGROUND OF THE INVENTION

1. Field of the Invention

The present invention relates to a radial tire improved in steering stability, durability and appearance by adopting a specified nylon cord of high modulus and excellent dimensional stability.

2. Description of the Prior Art

A nylon cord is widely used in bias tire for its excellent fatigue resistance and adhesive property to rubber. However, nylon cord heretofore, has not been used in a radial tire, because of the following problems.

When driving an automobile at high speed or under a heavy load, it is often the case that the temperature of the carcass of a tire rises up to 80°~120° C. depending on size of the tire. In a known cord composed of nylon 6 or nylon 66, loss tangent (tan δ) of dynamic viscoelasticity at the aforementioned temperature is so large that a flat spot is easily occurs after cooling.

Furthermore, when turning the automobile by reorienting tires, the automobile still has a tendency to maintain the running course as before due to inertia and produces a centrifugal force in the direction opposite to the turning direction of the automobile. As a result, a force to draw the automobile in a course of the tires, i.e., a side force acts from the road on the tires against the centrifugal force. In the case of conventional nylon cord, the modulus declines quite an extent when the temperature reaches 100° C. and over. Accordingly, when a tire composed of conventional cord is used at high speed and the temperature thereof rises up to such a degree, the rigidity of the carcass of the tire is inclined, and when the side force is added at the time of turning, the tire becomes deformed to reduce the side force, eventually declining the controllability thereby.

Moreover, a manufacturing process of these tires usually comprises the step of applying a rubber coating to a tire cord fabric composed of a plurality of cords, the step of cutting the rubber coated tire cord fabric at the specified length, and a step of lap-splicing both ends of 2-10 pieces of fabric along cord to obtain a cylindrical green tire. Thus it is inevitable for the tire to have at least a lap-splice portion. Since the density of cord at such a lap-splice portion is necessarily high as compared with other portions of the tire, at the vulcanization step, the heat shrinkage factor of the lap-splice portion in its entirety becomes larger even if the heat shrinkage stress of each cord remains unchanged. As a result, a side wall undulation occurs in the side of the tire affecting the appearance and declining the modulus of the cords of the tire.

As discussed above, when the temperature of the tire carcass is higher than 100° C. under high speed driving of an automobile, the modulus of the conventional nylon 6 and nylon 66 cords is small and the thermal dimensional stability thereof is low.

To meet these problems, a radial tire for use in passenger cars comprising a nylon cord of relatively small heat shrinkage composed of nylon 6 or 66 having been spun at a high speed was proposed as disclosed in Japanese laid open Patent Publication (unexamined) No. 59-89203. This nylon cord of low heat shrinkage has a thermal dimensional stability approximate to that of polyester, which is not sufficient and the modulus at high temperature is still low. As a result, steering stability of the proposed radial tire is insufficient, and moreover there exists such problems, as occurrence of flat spot, poor appearance due to side wall undulation in the tire, etc.

SUMMARY OF THE INVENTION

Accordingly, an object of the present invention is to provide a radial tire improved in appearance and steering stability without a flat spot composed of a nylon cord of high modulus and excellent thermal dimensional stability.

In order to accomplish the foregoing object, as a result of aggressive studies, the present inventor found that when using a nylon cord composed of a polytetramethyleneadipamide (hereinafter referred to as "nylon 46"), Young's modulus is not declined so much as compared with other fiber cords of nylon 6, nylon 66, polyester, etc., that the modulus of the cord of nylon 46 at high temperature is high when it is heat set at appropriate conditions, and that a tire comprising a carcass ply composed of such nylon 46 is considerably improved in the condition of cornering property under the driving at a high speed.

Thus, in accordance with this invention, there is provided the radial tire comprising a carcass ply of a nylon cord substantially composed of a polytetramethylene adipamide impregnated with an adhesive and heat set in a drawn state, and which has a characteristic of $$Md > 20$$

$$Em \cdot Sf < 2.2$$

where: Md is a modulus (g/d) obtained from a force necessary for stretching 2% at 100° C., Em is an elongation percentage (%) under a load of 2.7 g/d at room temperature, and Sf is a heat shrinkage stress (g/d) at 150° C. Preferably the nylon cord is heat set at 200°–280° C. and more preferably at 240°–260° C.

DESCRIPTION OF THE PREFERRED EMBODIMENT

Figure 1:
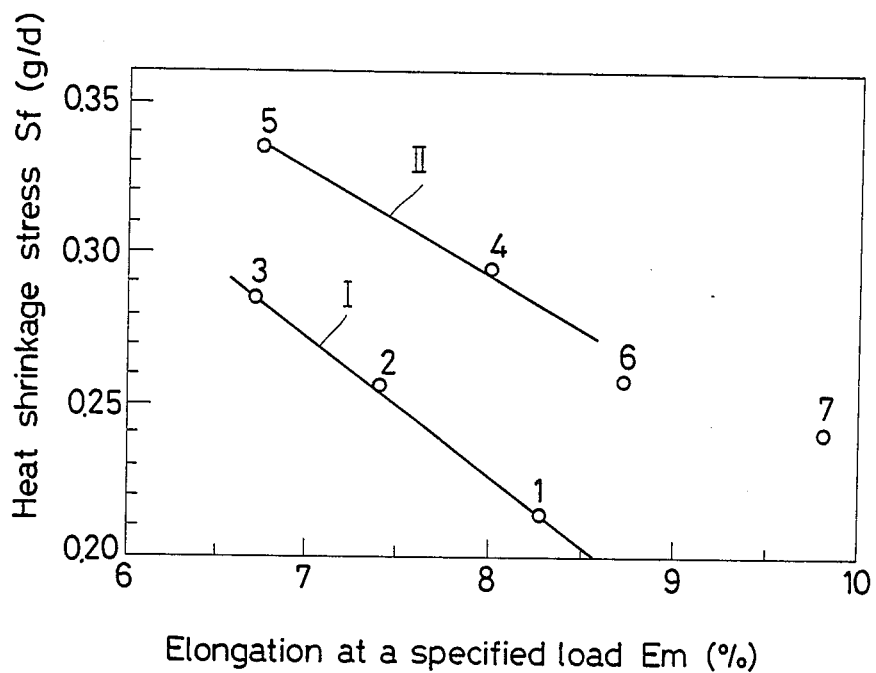
FIG. 1 is a graph showing a relation between elongation at a specified load and heat shrinkage stress when heat setting conditions of various nylon cords are changed.

A nylon cord used in this invention is a cord of nylon 46 substantially composed of a polytetramethylene adipamide, and manufactured by the step of melt-spinning the nylon 46 at the temperature of 300°–340° C., a step of drawing a spinned yarn at the temperature of 100°–150° C., and the step of further drawing it at a temperature of 170°–210° C., as disclosed in Japanese laid open Patent Publications (unexamined) No. 59-76914 and No. 59-88910.

Then the nylon 46 cord of size 1260d/2 is impregnated with an adhesive solution composed of resorcineformalin resin and rubber latex, and heat set under various conditions changing the temperature and elongation percentage. FIG. 1 shows a relation between the elongation percentage at a load of 2.7 g/d at room temperature (hereinafter referred to as "elongation at a specified load") Em and the heat shrinkage stress Sf. In FIG. 1, lines I and II show respective results of measuring cords of nylon 46 heat set at the temperature of 250° C. and 190° C., and wherein point 6 shows an untreated cord of nylon 66 while point 7 that of nylon 46.

When heat setting a cord while applying a large tension thereto, the stretched cord is fixed as is. As a result, the elongation at a specified load Em becomes small when stretching the cord by applying a load thereto. When reheating the heat set cord, a heat shrinkage stress Sf occurs to eliminate the residual strain. Thus, when the heat setting is performed by changing the stretching coefficiency only, it is found that the elongation at a specified load Em is small and the heat shrinkage stress Sf is large when the residual strain is large, enabling the Em and Sf to be plotted in a straight line as shown in FIG. 1. But when changing other heat setting conditions particularly temperature and stretching time, the result is shown in different straight lines as illustrated by lines I and II.

When heating the heat set nylon cord to eliminate a part of the residual strain, the elongation at a specified load Em and the heat shrinkage stress Sf change accordingly along the straight line in FIG. 1. For example, when heating a cord heat set to point 2, the elongation at a specified load Em and the heat shrinkage stress Sf change to point 1.

In the cord of nylon 46 used for a carcass of a radial tire in accordance with this invention, it is required that both heat shrinkage stress Sf (g/d) of the cord during the vulcanization process of the tire and elongation at a specified load Em (%) are reduced, and therefore it is preferred to use a cord in which the product of Em·Sf is not more than 2.2, more preferably, in the range of 1.0–2.0 and the modulus Md is not less than 20 g/d at 100° C. When the product of Em·Sf is more than 2.2, a side wall undulation occurs in the side of the tire spoiling the appearance and the rigidity of the carcass is declined, which results in eventually lowering the steering stability of the tire. On the other hand, when the product of Em·Sf is less than 1.0, the strength of the cord is remarkably decreased. When the modulus of nylon cord of a carcass is less than 20 g/d at 100° C., the steering stability during high speed driving is declined.

The modulus of a cord of nylon 46 can be controlled to a certain extent by selecting an appropriate twist coefficient and heat setting condition. A twist coefficient K can be expressed as follows:

$$K = T \times \sqrt{D/\rho}$$

where: T is an average of the times of turn of first twist and those of final twist per 10 cm, D is a total denier of the cord, and $\rho$ is a specific gravity 1.175. It is preferred that the twist coefficient K is in the range of 1300–2400. When K is less than 1300, the fatigue resistance is insufficient, and when K is over 2400, the modulus becomes small, making it impossible to put such a cord to any practical use.

Thus, the heat setting condition of the nylon 46 cord is selected so that the elongation at a specified load is in the range of 4–9%. Because a rather severe heat setting condition resulting in decline of strength of the cord is required to make the elongation at a specified load less than 4%. On the other hand, when the elongation at a specified load Em is over 9%, it becomes impossible to obtain a modulus of not less than 20 g/d at 100° C.

Thus, according to the radial tire of the present invention, since the carcass cord is heat set at optimum temperature and the modulus thereof is large at high temperature, even when the temperature of the tire rises during high speed driving, a large cornering power is obtained by turning direction of wheel travel, i.e., steering stability for cornering is improved. A flat spot does not occur since the elongation at a specified load Em is small and the heat shrinkage stress Sf of the cord is small, thereby the product of Em·Sf is small. Furthermore, since the heat shrinkage stress of the carcass cord is small, any particular large shrinkage force is not applied to the lap-splice portion of the carcass ply during the vulcanization process of the tire, and therefore a tire of excellent appearance without undulation of the side walls of the tire can be obtained.

Described hereunder is an example of the present invention and controls.

Example and Controls 1–3

A raw cord of nylon 46 shown in Table 1 is formed into a tire cord fabric, and after being soaking in aqueous dispersion of an adhesive composed of resorcineformalin resin and latex, the tire cord fabric is heat set under the conditions shown in Table 1 and coated with rubber. Five pieces of cut ply of rubberized cord fabric are lap-spliced and formed into a piece of carcass ply, and this carcass ply is formed into a radial tire of size 175/70R13. Characteristics of the heat set cord and a test result of the tire are shown in Table 1.

Tires of the same size as the example are manufactured respectively composed of cords of nylon 46 heat set under different conditions and cords of nylon 66 and polyester and their test results are also shown in Table 1 as Controls 1–3.

TABLE 1

|  |  |  | Example | Control 1 | Control 2 | Control 3 |
|---|---|---|---|---|---|---|
| Raw cord | Material of cord |  | Nylon 46 | Nylon 46 | Nylon 66 | Polyester |
|  | Denier |  | 1260/2 | 1260/2 | 1260/2 | 1500/2 |
|  | Twist Coefficient K |  | 1760 | 1760 | 1838 | 1857 |
| Processed cord | Heat setting temperature | °C. | 250 | 190 | 210 | 230 |
|  | Elongation at a specified load Em | % | 6.7 | 8.0 | 8.7 | 4.5 |
|  | Heat shrinkage stress Sf | g/d | 0.28 | 0.29 | 0.26 | 0.12 |
|  | Em · Sf |  | 1.88 | 2.82 | 2.26 | 0.54 |
|  | Modulus at room temperature | g/d | 27 | 24 | 28 | 43 |
|  | Modulus M/d at 100° C. | g/d | 25 | 21 | 20 | 31 |
|  | Modulus at 200° C. | g/d | 21 | 19 | 17 | 18 |
|  | Modulus retention at 100° C. | % | 92 | 88 | 77 | 72 |
| Tire | Side irregularities | Index | 40 | 60 | 110 | 100 |
|  | Cornering power | Index | 100 | 99 | 98 | 100 |
|  | Number of carcass end | per 25 mm | 28 | 28 | 28 | 24 |
|  | Peeling force of carcass | Index | 170 | 170 | 170 | 100 |

TABLE 1-continued

|  | Example | Control | | |
|---|---|---|---|---|
|  |  | 1 | 2 | 3 |
| ply |  |  |  |  |

In the above table, the elongation at a specified load Em is an elongation percentage obtained by measurement under the load of 2.7 g/d as a tensile test of constant rate of extension according to ASTM D885, while the modulus is a value obtained by measuring a force at the elongation percentage of 2% by means of a tensile tester for constant rate of extension according to ASTM D885 and calculated by an expression $$Md = Force/0.02$$

The heat shrinkage stress Sf is a dry heat shrinkage force according to ASTM D885 measured at the atmosphere of 150° C. The side wall undulation means an average value of values obtained by measuring a depth of each recess on the tire side wall by means of a dial type depth meter.

The cornering power is determined by steps of pressing the tire inflated to 1.9 kg/cm² against a wheel of tester, running preliminarily the tire under the load of 600 kg at the speed of 80 km/hr for 60 minutes until the temperature of the tire reaches a steady state, reducing the load to 405 kg, measuring the side force at the slip angle of 2° and calculating the cornering power by side force/2.

The peeling test is performed to determine a force required for peeling a cord layer from a rubber according to ASTM D751 by preparing test samples of 25 mm in width along the carcass cord.

When comparing the foregoing example with the controls, it is found that the modulus at 200° C. and the modulus retention at 100° C. of a nylon 46 cord are larger than those of conventional nylon 66 cord and polyester cord, enabling the heat setting at higher temperature.

Accordingly, when the heat setting temperature of nylon 46 cord is high, the modulus becomes high, the elongation at a specified load small and the heat shrinkage stress small, and as a result, the side wall undulation are less in the tire of nylon 46 cord. Regarding the steering stability (cornering power), the tire of Example is as excellent as the tire of polyester cord and more excellent than the other conventional tires.

The adhesion of the cord with rubber in the tire of Example is as excellent as in the tire with conventional nylon cord shown in Control 2 and more excellent than in the tire with polyester cord.

What is claimed is:

1. A radial tire comprising a carcass ply of nylon cord substantially composed of polytetramethylene-adipamide impregnated with an adhesive and heat set at 240°–260° C. in a drawn state, and which has a characteristic of $$Md > 20$$

$$Em \cdot Sf < 2.2$$

where: Md is the modulus (g/d) obtained from a force necessary for stretching in an amount of 2% at 100° C., Em is the elongation percentage (%) under a load of 2.7 g/d at room temperature, and Sf is the heat shrinkage stress (g/d) at 150° C.

2. The radial tire as claimed in claim 1, wherein the adhesive is a solution composed of resorcinol-formalin resin and rubber latex.

* * * * *